(12) United States Patent
Ayers

(10) Patent No.: US 6,283,223 B1
(45) Date of Patent: Sep. 4, 2001

(54) LAWN EDGING INSERTION TOOL

(76) Inventor: Roy Ayers, 300 19th St., Mendota, IL (US) 61342

(*) Notice: Subject to any disclaimer, the term of this patent is extended or adjusted under 35 U.S.C. 154(b) by 0 days.

(21) Appl. No.: 09/428,700

(22) Filed: Oct. 27, 1999

(51) Int. Cl.[7] ................................................. A01B 1/00
(52) U.S. Cl. ......................... 172/17; 172/371; 30/DIG. 5
(58) Field of Search .................... 172/13, 17, 18, 172/371, 381; 30/DIG. 5, 314, 315, 340, 342, 344, 308, 308.1, 308.3, 297; 294/57, 59, 60

(56) References Cited

U.S. PATENT DOCUMENTS

| | | | | |
|---|---|---|---|---|
| 1,157,809 | * | 10/1915 | Schmidt | 172/17 |
| 1,180,783 | * | 4/1916 | Mason | 172/17 |
| 1,447,805 | * | 3/1923 | Miller | 172/13 |
| 2,001,921 | * | 5/1935 | Petteys | 172/17 |
| 2,021,625 | * | 11/1935 | Fell | 30/294 |
| 2,568,468 | * | 9/1951 | Smith | 172/17 |
| 2,748,685 | * | 6/1956 | Sogar | 172/16 |
| 3,011,562 | * | 12/1961 | Brasch | 172/17 |
| 3,131,683 | * | 5/1964 | Hunsaker | 172/13 X |
| 3,599,726 | * | 8/1971 | Iacurci | 172/17 |
| 3,946,815 | * | 3/1976 | Ajdukovic | 172/17 |
| 4,052,791 | * | 10/1977 | Anesi | 172/18 X |
| 5,109,930 | * | 5/1992 | Napier | 172/13 |
| 5,609,213 | * | 3/1997 | Anderson | 172/17 |

* cited by examiner

Primary Examiner—Victor Batson
(74) Attorney, Agent, or Firm—John D. Gugliotta; Michael Corrigan

(57) ABSTRACT

The invention is an all-in-one hand-held lawn edging tool. This device is essentially a handle with lawn edging attachments interchangeable with the handle portion. A 4–5" steel pipe with handle, wheel and cutting edge are included. To complete the edging of an area, one makes a slit in the ground with the cutting edge, and then slides the rounded edge through the slit on the ground. Then, the plastic edging is inserted and the handle on the tool is used to stamp the ground around the edging.

5 Claims, 3 Drawing Sheets

LAWN EDGING INSERTION TOOL

RELATED APPLICATIONS

The present invention was first described in Disclosure Document Number 458,998 filed on Jul. 6, 1999. There are no previously filed, nor currently any co-pending applications, anywhere in the world.

BACKGROUND OF THE INVENTION

1. Field of the Invention

The present invention relates generally to lawn and garden tools and, more particularly, to an improved lawn edging insertion tool.

2. Description of the Related Art

Many Americans spend countless hours maintaining and beautifying their lawns and landscape. As a matter of pride and personal expression, these people manicure their grass, plant and maintain flowers, shrubs, bushes and trees all for the sake of enhancing the aesthetic qualities of their property. One popular item that has found favor with many people in recent times is plastic lawn edging. This edging, usually black in color, is placed around sidewalks, flower beds and other areas where the growth of grass is not desired. Often in installing this edging, one must use many shovels, hammers, and other tools to complete the installation process. While this procedure undoubtedly works, it takes much time and often produces less than stellar results. While this increased time to install edging may be acceptable for the amateur or homeowner, professional landscapers can benefit from any tool or accessory which reduces time and increases profits. Accordingly, there is a need for a means by which plastic lawn edging can be installed in a quick and easy manner using a minimum of tools and results in a quality looking final product. The development of The Lawn Edging Tool fulfills this need.

In the related art, there exists many patents for devices for performing the task known as lawn edging whereby the grass overgrown onto the sidewalk is removed. This invention is not one of these devices. This invention creates a slit in the lawn so that conventional lawn edging strips may be inserted therein.

A search of the prior art did not disclose any patents that read directly on the claims of the instant invention; however, the following references were considered related:

| U.S. Pat. No. | Inventor | Issue Date |
| --- | --- | --- |
| 5,819,856 | Meyer | Oct. 13, 1998 |
| 5,594,990 | Brant et al. | Jan. 21, 1997 |
| 3,448,812 | Peters | June 10, 1969 |
| 1,329,176 | Haugen | Jan. 27, 1920 |
| 4,645,011 | Feikama et al. | Aug. 6, 1985 |
| 4,532,998 | Feikama et al. | Feb. 24, 1987 |
| 5,383,330 | Yokocho et al. | Jan. 24, 1995 |
| 5,226,486 | Naiser | Jul. 13, 1993 |
| 4,564,072 | Corbett | Jan. 14, 1986 |
| 4,043,103 | Lakin et al. | Aug. 23, 1977 |

SUMMARY OF THE INVENTION

It is therefore an object of the present invention to provide a lawn edging insertion tool.

It is another object of the present invention to provide a tool specially designed to aid in installation of black plastic lawn edging.

It is yet another object of the present invention to eliminate digging with a shovel.

It is yet still another object of the present invention to install lawn edging quickly and easily.

It is still yet another object of the present invention to save time for both professionals and amateurs alike.

It is another object of the present invention to aid in alignment of long installations of edging.

It is a feature of the present invention to provide a detachable cutting edge.

It is another feature of the present invention to provide a guide wheel mounted directly to the handle.

It is yet another feature of the present invention that it can be operated from upright position.

It is yet still another feature of the present invention that the "T" Handle aids in the operation of the cutting edge and rounding over section.

It is yet still another feature of the present invention that it can also be used to tamp earth back around edging.

Briefly described according to one embodiment of the present invention, The Lawn Edging Tool, as its name implies, is an apparatus that aids in the installation of plastic lawn edging. The lawn edging that the invention installs is commonly found, and is in the shape of a flat surface with a circular portion, approximately one inch in diameter, at the top surface. It is usually found black in color. The invention aids in the installation of this edging by first cutting the turf with the aid of a built in cutting blade. The blade is then removed and the rounded edge of the invention is pushed through the cut to open it further. The plastic edging is then inserted to the desired depth. The upper end of the handle on the invention is "T" shaped in nature and is used to tamp the earth back into place around the edging. The use of The Lawn Edging Tool allows for the installation of plastic lawn edging with only one tool using minimum effort to produce a quality installation in a quick and easy manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| LIST OF REFERENCE NUMBERS | | | |
| --- | --- | --- | --- |
| 10 | Lawn Edging Insertion Tool | 19a | Blade Tubing |
| 15 | Shaft | 19b | Aperture |
| 15a | Aperture | 20 | Wheel |
| 15b | Receiving Post | 20a | Aperture |

-continued

LIST OF REFERENCE NUMBERS

| 16 | T Handle | 20b | Bolt |
| 17 | Foot Rail | 20c | Washer |
| 18 | Brace | | |
| 19 | Blade | | |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
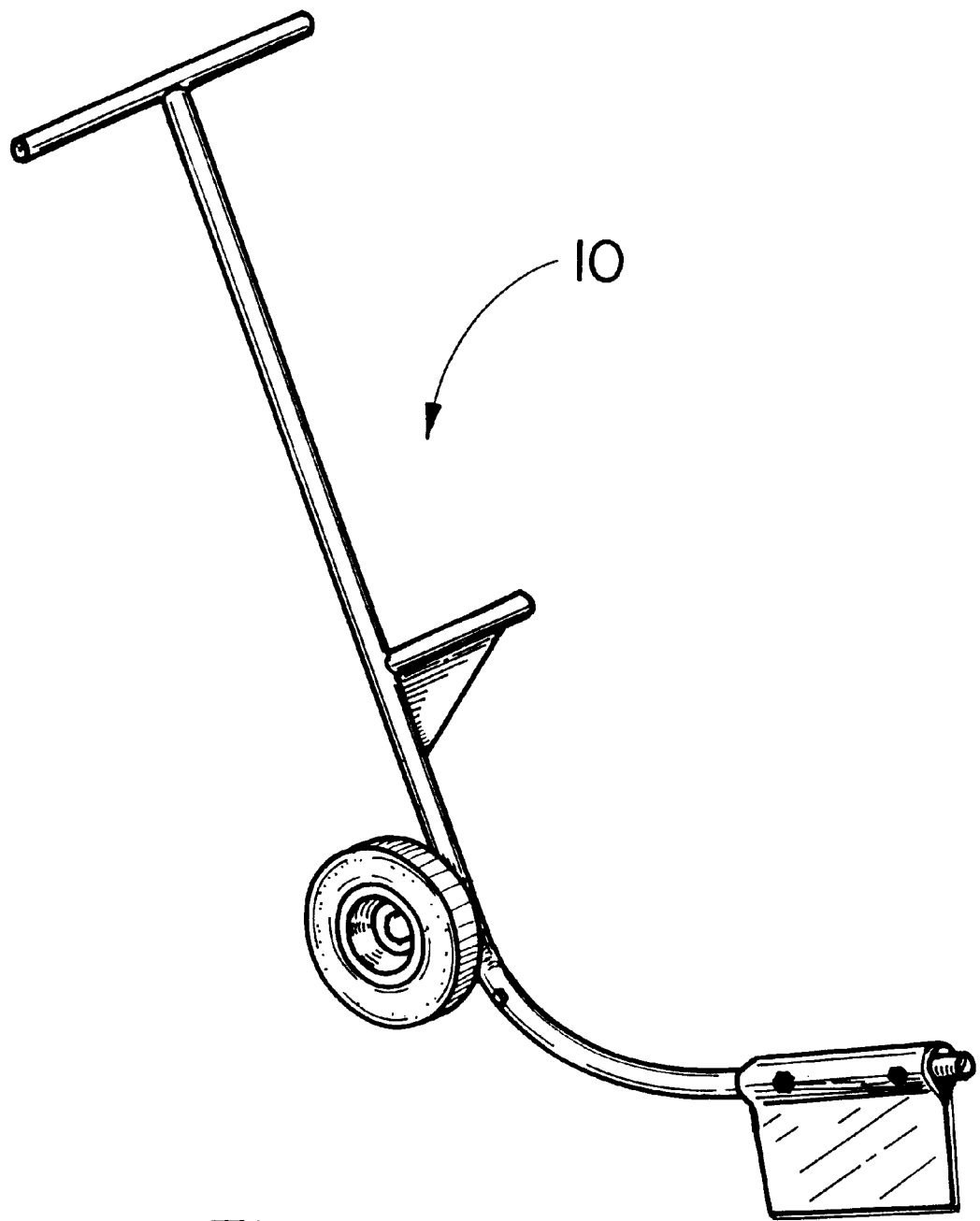
FIG. 1 is a perspective view of a Lawn Edging Insertion Tool, according to the preferred embodiment of the present invention.
Figure 2:
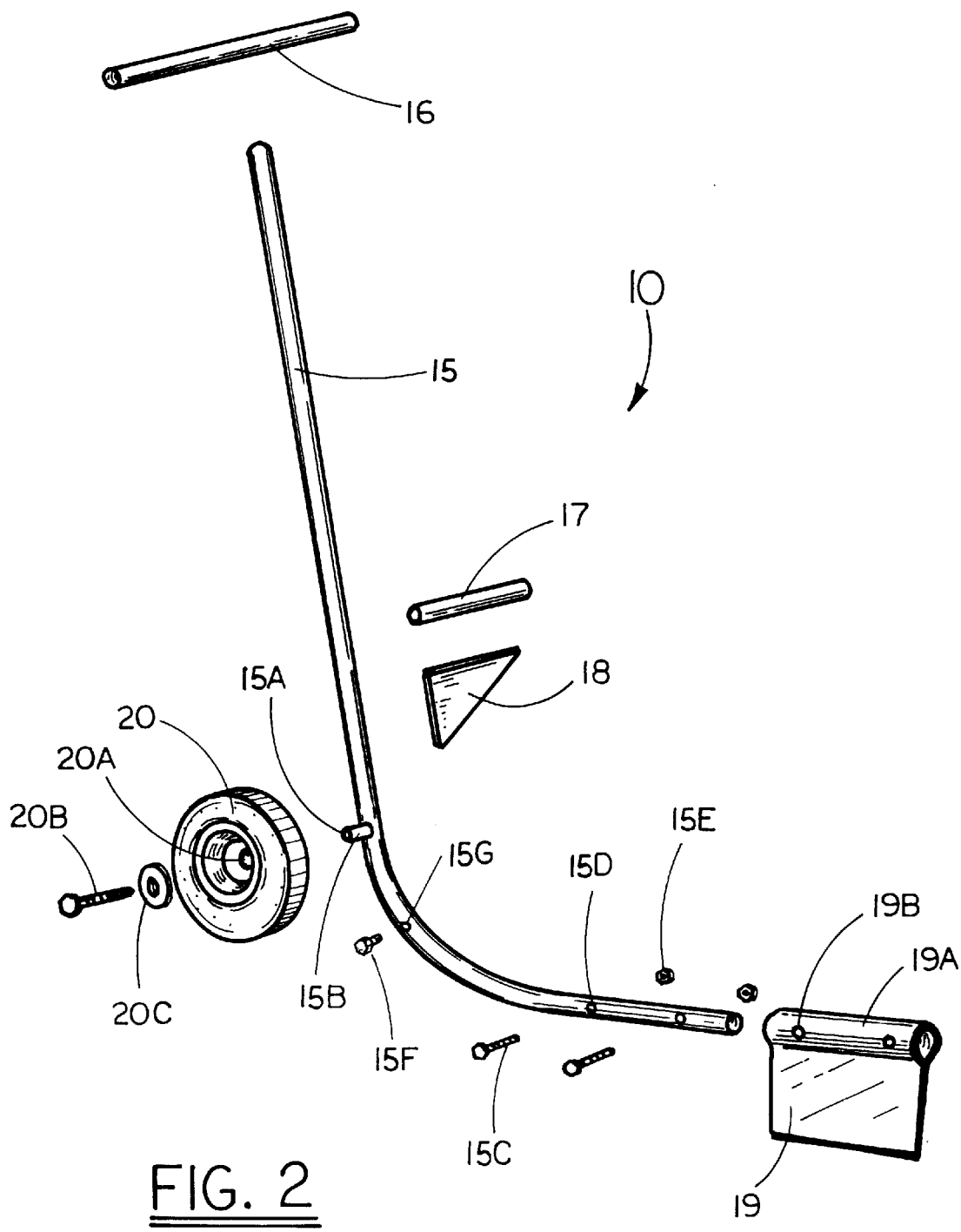
FIG. 2 is an exploded perspective view of a Lawn Edging Insertion Tool, according to the preferred embodiment of the present invention.

Referring now to FIG. 1, a Lawn Edging Insertion Tool 10 is shown, according to the present invention, for creating a slit in the lawn surface for installing conventional lawn edging strips. FIG. 2 shows a Lawn Edging Insertion Tool 10 comprised of an elongated hollow shaft 15 made of metal curved 90° at the lower end. A "T" handle 16 made from the same tubing as shaft 15 is welded perpendicularly to the top end of shaft 15. A sidewardly extending foot rail 17 is located near the lower end of said shaft 15. Foot rail 17 is made from another piece of the same tubing material as shaft 15 and welded perpendicularly to the shaft and extending to the side of shaft 15 that is on the users left as the user grips "T" handle 16. Welded directly beneath foot rail 17 is a triangular piece of metal acting as a brace 18 for foot rail 17. The legs of the triangular piece of metal are welded to the lower side of foot rail 17 and to shaft 15 as shown. Located on the opposite side of shaft 15 is a wheel 20 used for guiding the device along the ground. Wheel 20 is secured to a receiving post 15b via a bolt 20b and washer 20c inserted through aperture 20a in wheel 20 received by a threaded aperture 15a in receiving post 15b.

Located on the lower end of shaft 15 is a blade 19 designed for cutting into sod for inserting a strip of conventional lawn edging. Blade 19 is made of hardened metal such as steel and formed to the shape as shown and welded attached to a hollow tubular portion (blade tubing) 19a on the top. The bottom edge is ground to a sharpened edge for cutting the sod. Blade 19 is secured to shaft 15 via by sliding blade tubing 19a of blade 19 over shaft 15. Apertures 19b in blade tubing 19a of blade 19 and apertures 15d in shaft 15 allow the insertion of bolts 15c and removably secured thereon by nuts 15e. It is an intended feature of the invention that blade 19 be secured to shaft 15 via bolts so as to be removable for sharpening or replacement.

Figure 3:
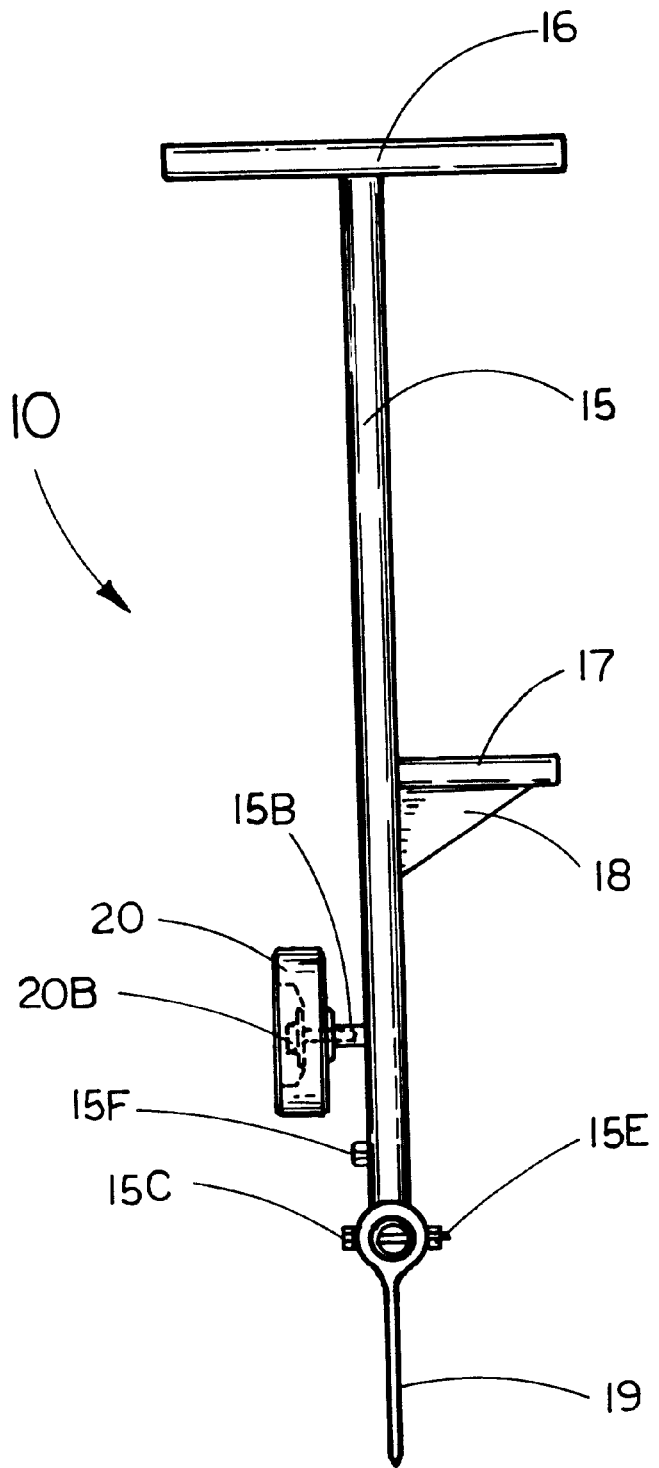
FIG. 3 is a front view of a Lawn Edging Insertion Tool, according to the preferred embodiment of the present invention.

FIG. 3 shows a front view of a Lawn Edging Insertion Tool 10 showing the sidewardly extending foot rail 17 and wheel 20 located on the opposite side of shaft 15. Wheel 20 is located slightly lower than foot rail 17 so that wheel 20 will contact the ground and act as a guide for the exact depth that blade 19 should penetrate the sod.

2. Operation of the Preferred Embodiment

In operation, the blade of present invention is pressed to the ground. A foot rail on the side of the device is provided to allow the user to put their body weight through their foot and leg into pressing the blade into the ground. A "T" handle is provided to allow the user to push/pull the device as needed. A guide wheel is also provided to guide the depth in which the blade penetrates the sod and to guide the device over longer distances where it is desired to cut in a straight line. The slit formed in the ground allows a strip of conventional lawn edging to be inserted. The blade may be removed as needed for sharpening or replacement. The handle may then be used to tamp the ground around the edging.

The foregoing description is included to illustrate the operation of the preferred embodiment and is not meant to limit the scope of the invention. The scope of the invention is to be limited only by the following claims.

What is claimed is:

1. A lawn edging insertion tool for creating a slit in a lawn surface for installing conventional lawn edging strips, said lawn edging insertion tool comprising:

an elongated hollow shaft having an upper end and a lower end, said lower end having curved 90° to said shaft;

a handle affixed to said upper end perpendicularly to a top end of said shaft;

a foot rail, said footrail located near the lower end of said shaft and extending sidewardly therefrom;

a brace for said footrail, said brace affixed to said footrail and formed in a triangular fashion;

a wheel, said wheel located on a side of said shaft opposite from said brace, said wheel for guiding the lawn edging insertion tool along the ground; and a blade, said blade located on a lower end of said shaft, said blade further adapted for cutting into sod for inserting a strip of conventional lawn edging, said blade is made of hardened metal and formed in a curved shape and having a sharp edge along a bottom thereof, said blade being secured slidably to said shaft.

2. The lawn edging insertion tool of claim 1, wherein said shaft is formed of tubular metal.

3. The lawn edging insertion tool of claim 1, wherein said handle is formed of tubular metal.

4. The lawn edging insertion tool of claim 1, wherein said footrail is formed of tubular metal.

5. The lawn edging insertion tool of claim 1, wherein said wheel is secured to a receiving post via a bolt and washer inserted through said wheel, and further received by a threaded aperture formed by said receiving post.

* * * * *